US011897158B2

(12) United States Patent
Barber et al.

(10) Patent No.: US 11,897,158 B2
(45) Date of Patent: Feb. 13, 2024

(54) IMPELLERS FOR CUTTING MACHINES AND CUTTING MACHINES EQUIPPED THEREWITH

(71) Applicants: Urschel Laboratories, Inc., Chesterton, IN (US); PepsiCo, Inc., Plano, TX (US)

(72) Inventors: Keith Alan Barber, Frisco, TX (US); Corey Everette Baxter, Valparaiso, IN (US); Rebecca Glynn Gann, The Colony, TX (US)

(73) Assignees: Urschel Laboratories, Inc., Chesterton, IN (US); Pepsico, Inc., Plano, TX (US)

( * ) Notice: Subject to any disclaimer, the term of this patent is extended or adjusted under 35 U.S.C. 154(b) by 177 days.

(21) Appl. No.: 17/077,356

(22) Filed: Oct. 22, 2020

(65) Prior Publication Data

US 2022/0126475 A1 Apr. 28, 2022

(51) Int. Cl.
*B26D 7/06* (2006.01)
*B26D 1/03* (2006.01)

(52) U.S. Cl.
CPC ............. *B26D 7/0691* (2013.01); *B26D 1/03* (2013.01)

(58) Field of Classification Search
CPC ................................ B26D 7/06; B26D 7/0691
USPC ............................................................ 83/403
See application file for complete search history.

(56) References Cited

U.S. PATENT DOCUMENTS 3,139,128 A 6/1964 Urschel et al.
3,139,129 A 6/1964 Urschel et al.
4,391,172 A * 7/1983 Galland .................. B26D 1/03 83/403
4,625,606 A * 12/1986 Pinegar .................. B26D 1/38 83/403
5,555,787 A * 9/1996 Barber .................. B26D 1/03 83/404.3

(Continued)

FOREIGN PATENT DOCUMENTS

| | | |
|---|---|---|
| JP | 2006509507 | 3/2006 |
| KR | 2014-0063882 | 5/2014 |

(Continued)

OTHER PUBLICATIONS

International Search Report and Written Opinion issued in PCT/US2022/033272 dated Oct. 17, 2022.

(Continued)

*Primary Examiner* — Adam J Eiseman
*Assistant Examiner* — Richard D Crosby, Jr.
(74) *Attorney, Agent, or Firm* — Hartman Global IP Law; Gary M. Hartman; Domenica N. S. Hartman

(57) ABSTRACT

Machines for cutting products and impellers suitable for use therein. Such an impeller includes a lower plate and paddles configured with the lower plate to direct material placed on the lower plate in a radially outward direction of the impeller under the influence of centrifugal forces when the impeller is rotated. At least one of the paddles has an outer radial extent that is adjacent a perimeter of the lower plate. At least a first exit hole is located in the lower plate and has a wall section that completely closes the first exit hole along the perimeter at an upper surface of the lower plate. The first exit hole extends through the lower plate to define a passageway connected to the upper surface to enable foreign debris at the upper surface to exit the impeller through the passageway.

46 Claims, 12 Drawing Sheets

(56) References Cited

U.S. PATENT DOCUMENTS

| | | | | |
|---|---|---|---|---|
| 8,161,856 | B2 * | 4/2012 | Jacko | B26D 7/0691 83/403 |
| 10,265,877 | B2 * | 4/2019 | Bucks | B26D 7/0691 |
| 10,647,014 | B2 * | 5/2020 | Khan | B26D 7/2614 |
| 11,186,005 | B2 * | 11/2021 | Bucks | B26D 1/36 |
| 2007/0240550 | A1 * | 10/2007 | Jacko | B26D 1/36 83/403 |
| 2008/0022822 | A1 * | 1/2008 | Jacko | B26D 7/0691 83/403 |
| 2010/0058911 | A1 * | 3/2010 | Goddard | B23D 59/006 83/478 |
| 2014/0230621 | A1 * | 8/2014 | Bucks | B26D 1/36 83/403 |
| 2017/0225348 | A1 * | 8/2017 | Jacko | B26D 7/08 |
| 2017/0239831 | A1 * | 8/2017 | Khan | B26D 7/2628 |
| 2019/0099910 | A1 | 4/2019 | Bucks | |
| 2022/0126475 | A1 | 4/2022 | Barber et al. | |
| 2022/0258371 | A1 | 8/2022 | Gereg | |

FOREIGN PATENT DOCUMENTS

| | | |
|---|---|---|
| KR | 2017-0092663 | 8/2017 |
| WO | 2007-124039 | 11/2007 |
| WO | 2022174007 | 8/2022 |

OTHER PUBLICATIONS

International Search Report and Written Opinion dated Jul. 20, 2021 for PCT Application No. PCT/US2020/056835.

* cited by examiner

IMPELLERS FOR CUTTING MACHINES AND CUTTING MACHINES EQUIPPED THEREWITH

BACKGROUND OF THE INVENTION

The present invention generally relates to machines for cutting products, including but not limited to slicing food products. The invention particularly relates to impellers for use with cutting machines.

Various types of equipment are known for slicing, shredding and granulating food products, as nonlimiting examples, vegetables, fruits, dairy products, and meat products. Widely used machines for this purpose are commercially available from Urschel Laboratories, Inc., and include machines under the name Model CC®. The Model CC® machines are centrifugal-type slicers capable of slicing a wide variety of products at high production capacities. The Model CC® line of machines is particularly adapted to produce uniform slices, strip cuts, shreds, and granulations. Certain configurations and aspects of Model CC® machines are represented in U.S. Pat. Nos. 3,139,128, 3,139,129, 5,694,824, 6,968,765, 7,658,133, 8,161,856, 9,193,086, 9,193,086, and 10,456,943 and U.S. Patent Application Publication No. 2016/0361831, the entire contents of which are incorporated herein by reference.

FIG. 1 schematically represents a cross-sectional view of a machine 10 that is representative of a Model CC® machine. The machine 10 includes a generally annular-shaped cutting head 12 and an impeller 14 coaxially mounted within the cutting head 12. The impeller 14 has an axis 17 of rotation that coincides with the center axis of the cutting head 12, and is rotationally driven about its axis 17 through a shaft (not shown) that is enclosed within a housing 18 and coupled to a gear box 16. The cutting head 12 is mounted on a support ring 15 above the gear box 16 and remains stationary as the impeller 14 rotates. Products are delivered to the cutting head 12 and impeller 14 through a feed hopper 11 located above the impeller 14. In operation, as the hopper 11 delivers products to the impeller 14, centrifugal forces cause the products to move outward into engagement with cutting knives (not shown) that are mounted along the circumference of the cutting head 12. The impeller 14 comprises generally radially oriented paddles 13, each having a face that engages and directs the products radially outward toward and against the knives of the cutting head 12 as the impeller 14 rotates. Other aspects pertaining to the construction and operation of Model CC® machines, including various embodiments thereof, can be appreciated from the aforementioned prior patent documents incorporated herein by reference.

FIG. 2 is an isolated view of a particular but nonlimiting example of a cutting head 12 that has been used with Model CC® slicing machines, including the machine 10 schematically represented in FIG. 1. The cutting head 12 represented in FIG. 2 will be described hereinafter in reference to the machine 10 of FIG. 1 equipped with an impeller 14 as described in reference to FIG. 1. On the basis of the coaxial arrangement of the cutting head 12 and the impeller 14, relative terms including but not limited to "axial," "circumferential," "radial," etc., and related forms thereof may be used below to describe the cutting head 12 represented in FIG. 2.

In FIG. 2, the cutting head 12 can be seen as generally annular-shaped with cutting knives 20 mounted at its perimeter. FIG. 2 represents the knives 20 as having straight cutting edges for producing flat slices, and as such may be referred to herein as "flat" knives, though the cutting head 12 can use knives of other shapes, for example, "corrugated" knives characterized by a periodic pattern, including but not limited to a sinusoidal shape with peaks and valleys when viewed edgewise, to produce corrugated, strip-cut, shredded and granulated products. Each knife 20 projects radially inward in a direction generally opposite the direction of rotation of the impeller 14 within the cutting head 12, and defines a cutting edge at its radially innermost extremity. The cutting head 12 further comprises lower and upper support rings 22 and ring 24 to and between which circumferentially-spaced support segments, referred to herein as shoes 26, are secured with fasteners 36. Each shoe 26 defines a cutting station of the cutting head 12.

The knives 20 of the cutting head 12 are individually secured with clamping assemblies 28 to the shoes 26. Each clamping assembly 28 includes a knife holder 30 mounted to and between the support rings 22 and 24, and a clamp 32 positioned on the radially outward-facing side of the holder 30 to secure a knife 20 thereto. Each knife 20 is supported by a radially outer surface of one of the knife holders 30, and the corresponding clamp 32 overlies the holder 30 so that the knife 20 is between the outer surface of the holder 30 and a radially inward surface of the clamp 32 that faces the holder 30. By forcing the clamp 32 toward the holder 30, the clamp 32 applies a clamping force to the knife 20 adjacent its cutting edge.

FIG. 2 further shows a gate 40 secured to each shoe 26. A food product crosses the gate 40 prior to encountering the knife 20 mounted to the succeeding shoe 26, and together the cutting edge of a knife 20 and a trailing edge of the preceding gate 40 define a gate opening that determines the thickness of a slice produced by the knife 20.

FIG. 3 is an isolated view of a particular but nonlimiting example of an impeller 14 that has been used with Model CC® slicing machines, including the machine 10 schematically represented in FIG. 1. FIG. 3 depicts that additional sets of mounting holes 34 may be provided to enable different numbers of paddles 13 to be mounted on the impeller 14 at alternative locations. The placement of the mounting holes 34 may also determine the orientation or pitch of each paddle face relative to a radial of the impeller 13 terminating at the outermost radial extent of the paddle face.

While the centrifugal-type Model CC® machines have performed extremely well for their intended purpose, further improvements are continuously desired and sought, including improvements relating to the maintenance of the machines. A nonlimiting example is the replacement of the knives 20, whose cutting edges are vulnerable to damage, for example, from impacts with rocks, sand, and other foreign debris that often accompany and may be imbedded in food products such as potatoes. FIGS. 3 and 4 represent one such approach by equipping the paddles 13 of the impeller 14 with multiple posts 42 located and spaced along outer radial extents of the paddles 13, forming multiple gaps 44 through which rocks and other foreign debris can pass and exit the impeller 14 and subsequently the cutting head 12 without damaging the paddles 13 of the impeller 14 or the knives 20 of the cutting head 12. The posts 42 can be replaceable, such as by being threading into a face at the outer radial extent of each paddle 13. The uppermost and lowermost extents of the paddles 13 are represented in FIGS. 3 and 4 as lacking a post 42 and instead as having what may be referred to as upper and lower shear edges 46 and 48, which inhibit accumulation of debris at the perimeter of the cutting head 12.

BRIEF DESCRIPTION OF THE INVENTION

The present invention provides, at least in part, machines for cutting products, including but not limited to centrifugal-type slicing machines adapted for slicing food products, and to impellers suitable for use in such machines.

According to one aspect, an impeller is provided that is adapted to be coaxially mounted within a cutting head for rotation about an axis of the cutting head. The impeller includes a lower plate having an upper surface, a lower surface, and a perimeter, and paddles configured with the lower plate to direct material placed on the lower plate in a radially outward direction of the impeller under the influence of centrifugal forces when the impeller is rotated. At least one of the paddles has an outer radial extent that is adjacent the perimeter of the lower plate. At least a first exit hole is located in the lower plate and has a wall section that completely closes the first exit hole along the perimeter at the upper surface of the lower plate. The first exit hole extends through the lower plate to define a passageway connected to the upper surface to enable foreign debris at the upper surface to exit the impeller through the passageway.

Technical aspects of impellers and cutting machines equipped therewith as described above may include the ability to reduce the likelihood of damage to knives and knife holders of such machines from impacts with rocks and other foreign debris that may accompany and may be imbedded in a material or product being cut, as a nonlimiting example, food products such as potatoes.

Other aspects and advantages of this invention will be appreciated from the following detailed description.

DETAILED DESCRIPTION OF THE INVENTION

Figure 1:
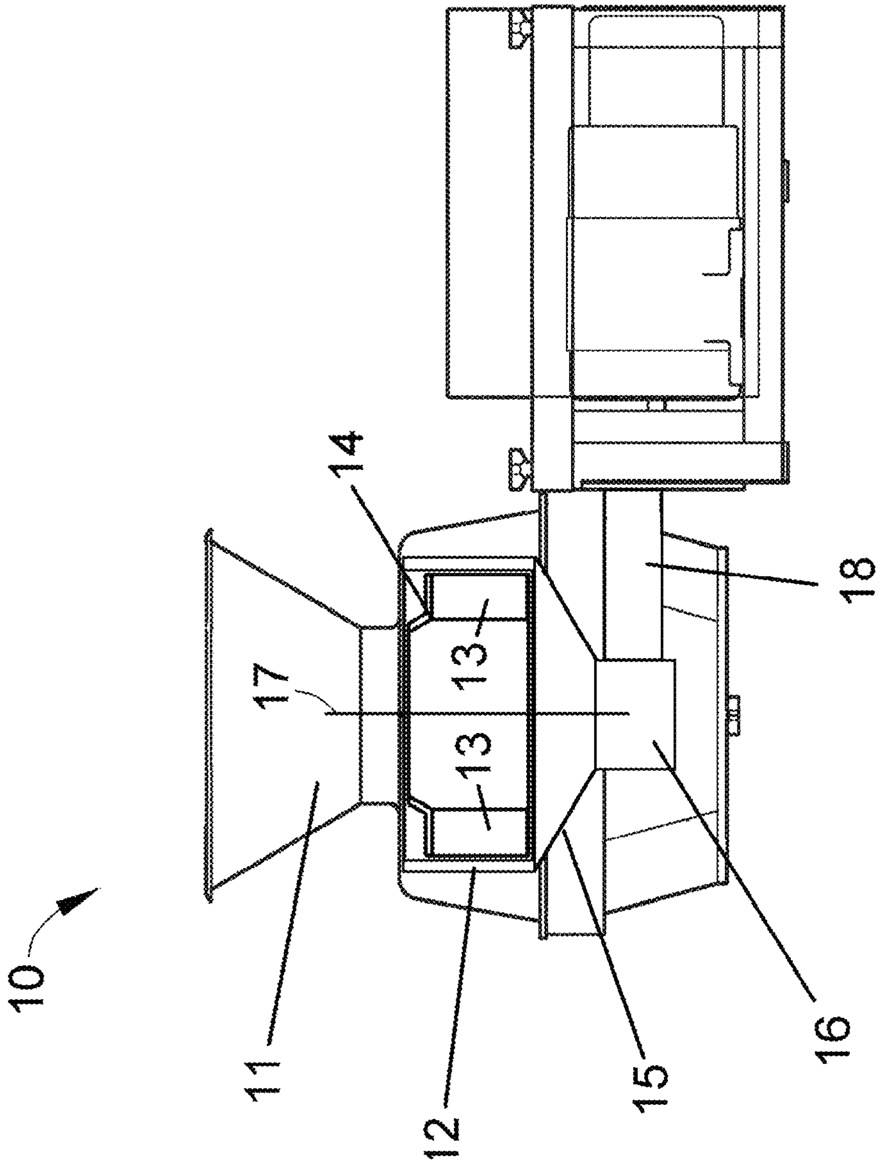
FIG. 1 PRIOR ART
FIG. 1 schematically represents a side view in partial cross-section of a centrifugal-type slicing machine known in the art.
Figure 2:
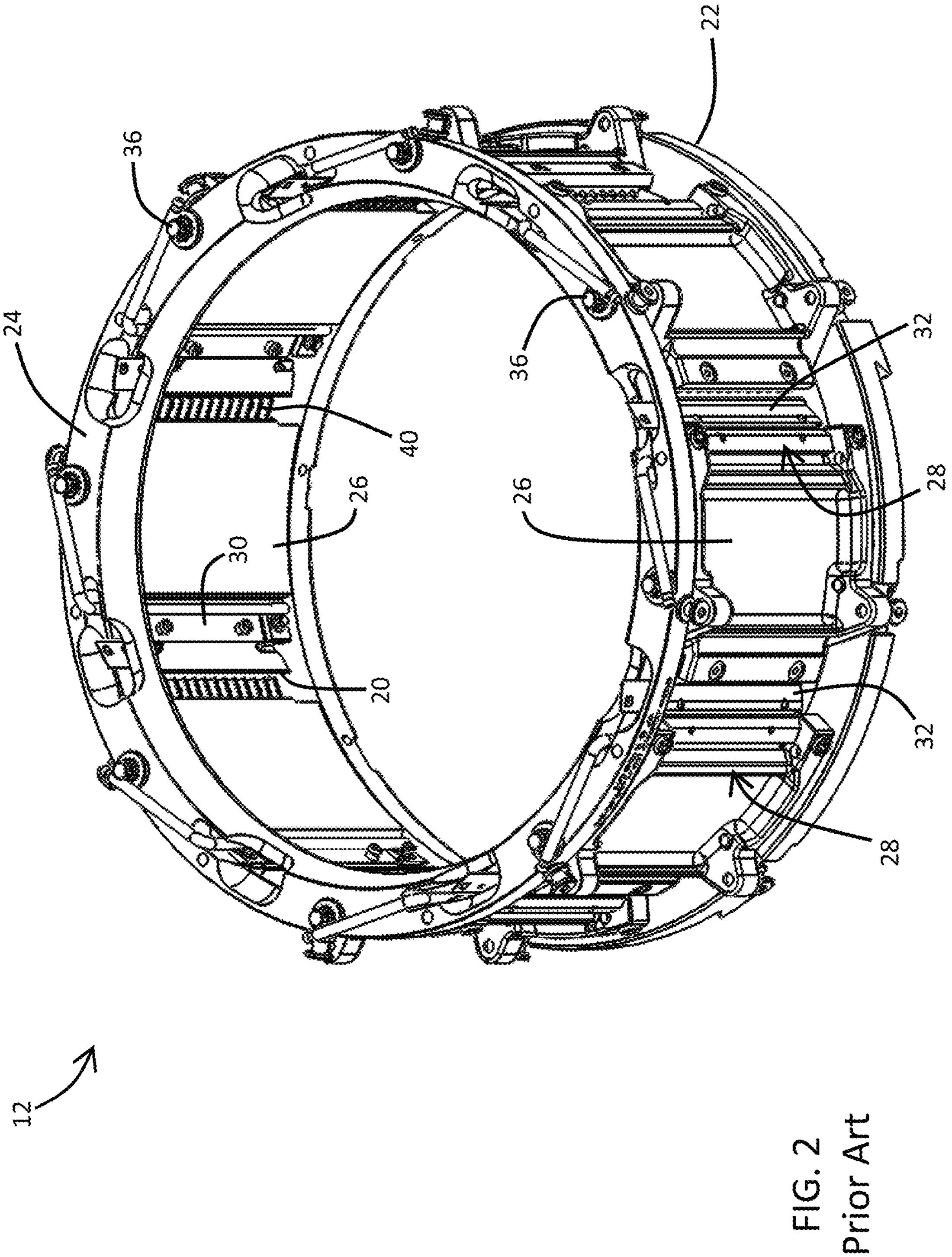
FIG. 2 Prior Art
FIG. 2 is a perspective view representing details of a cutting head that has found use in the slicing machine of FIG. 1.
Figure 4:
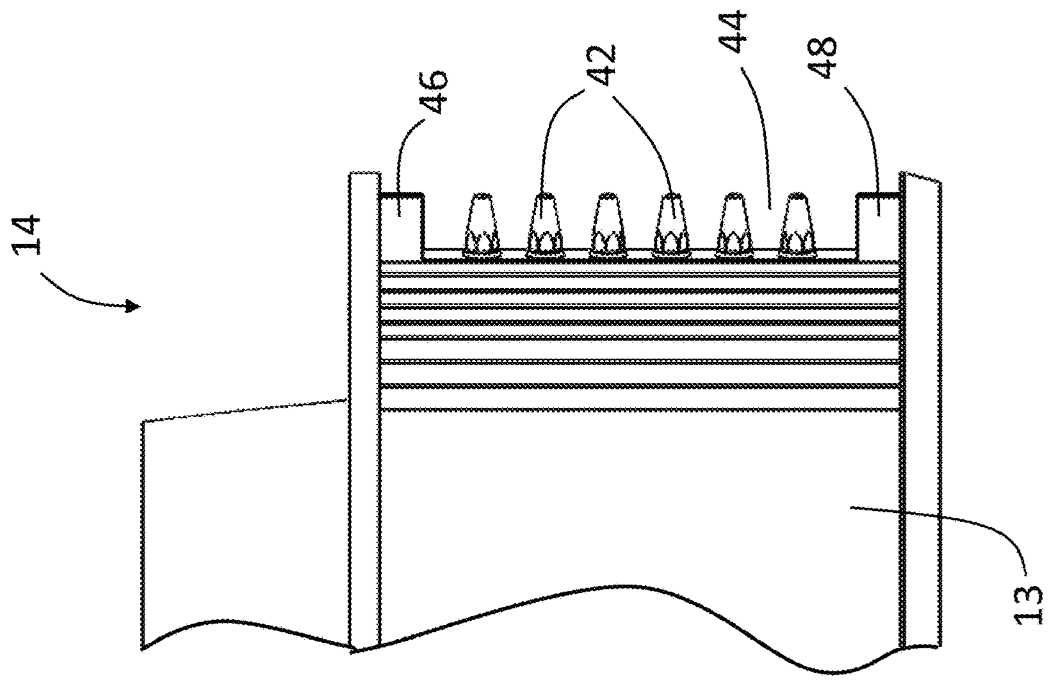
FIG. 4 Prior Art
FIG. 4 is a detailed side view of one paddle of the impeller of FIG. 3.
Figure 3:
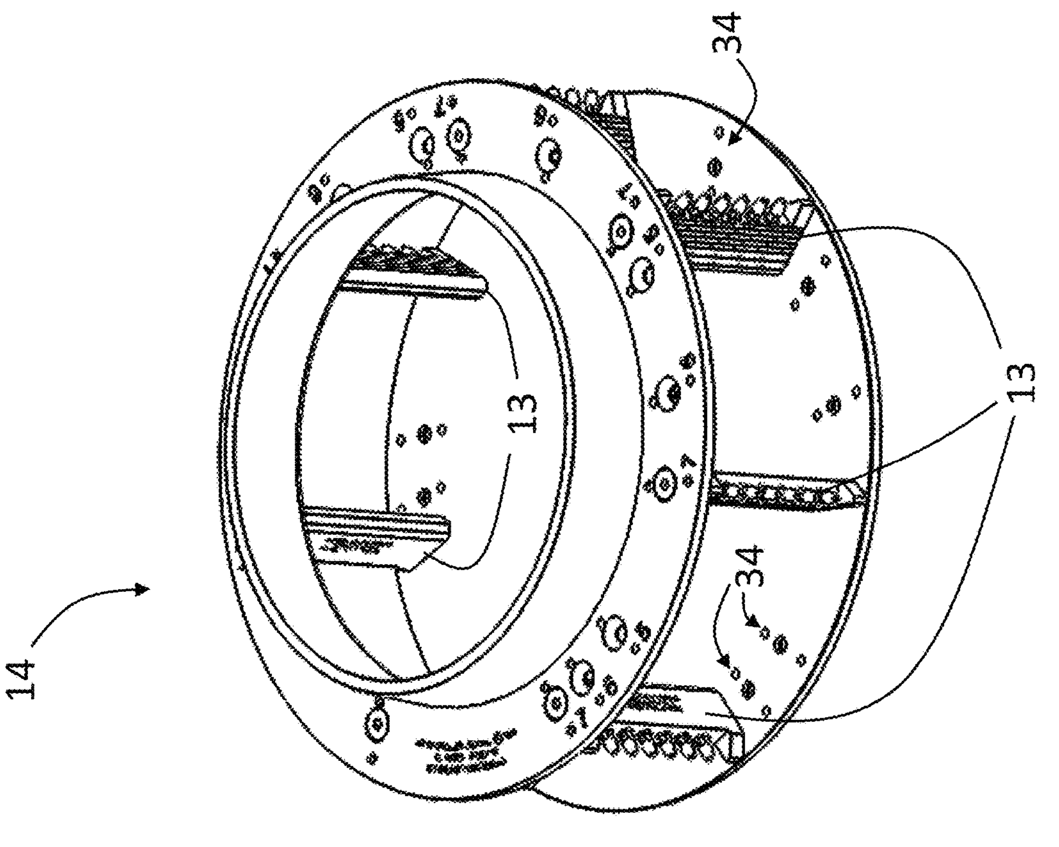
FIG. 3 Prior Art
FIG. 3 is a perspective view representing an impeller of a type that has found use in the slicing machine of FIG. 1 and the cutting head of FIG. 2.

FIGS. 5 through 16 schematically represent nonlimiting embodiments of impellers and components thereof that are capable of use with a variety of cutting machines, including the centrifugal-type slicing machine 10 depicted in FIG. 1 and the cutting head of FIG. 2, and in some instances may be a replacement or modification of an impeller for such machines. As a matter of convenience, nonlimiting embodiments of the invention will be illustrated and described hereinafter in reference to the slicing machine 10 of FIG. 1 equipped with an annular-shaped cutting head 12 as described in reference to FIGS. 1 and 2, and as such the following discussion will focus primarily on certain aspects of the invention that will be described in reference to the slicing machine 10 and cutting head 12, whereas other aspects not discussed in any detail below may be, in terms of structure, function, materials, etc., essentially as was described in reference to the impeller of FIGS. 1, 3, and 4. However, it will be appreciated that the teachings of the invention are also generally applicable to other types of cutting machines. Moreover, though such machines are particularly well suited for slicing food products, it is within the scope of the invention that impellers described herein could be utilized in cutting machines that cut a wide variety of other types of materials.

To facilitate the description provided below of the embodiments represented in the drawings, relative terms may be used in reference to the orientation of an impeller within the cutting head 12, as represented by the impeller 14 in FIG. 1. On the basis of the coaxial arrangement of the cutting head 12 and impeller 14 of the machine 10 represented in FIG. 1, relative terms including but not limited to "axial," "circumferential," "radial," etc., and related forms thereof may also be used below to describe the nonlimiting embodiments represented in the drawings. All such relative terms are useful to describe the illustrated embodiments but should not be otherwise interpreted as limiting the scope of the invention.

Figure 6:
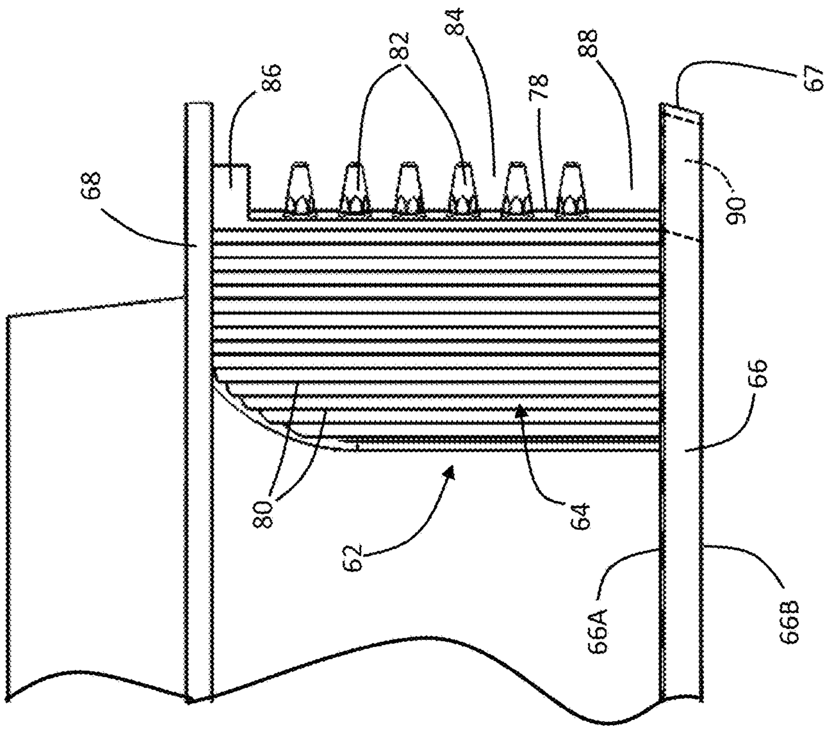
FIG. 6 is a detailed side view of one paddle of the impeller of FIG. 5.
Figure 5:
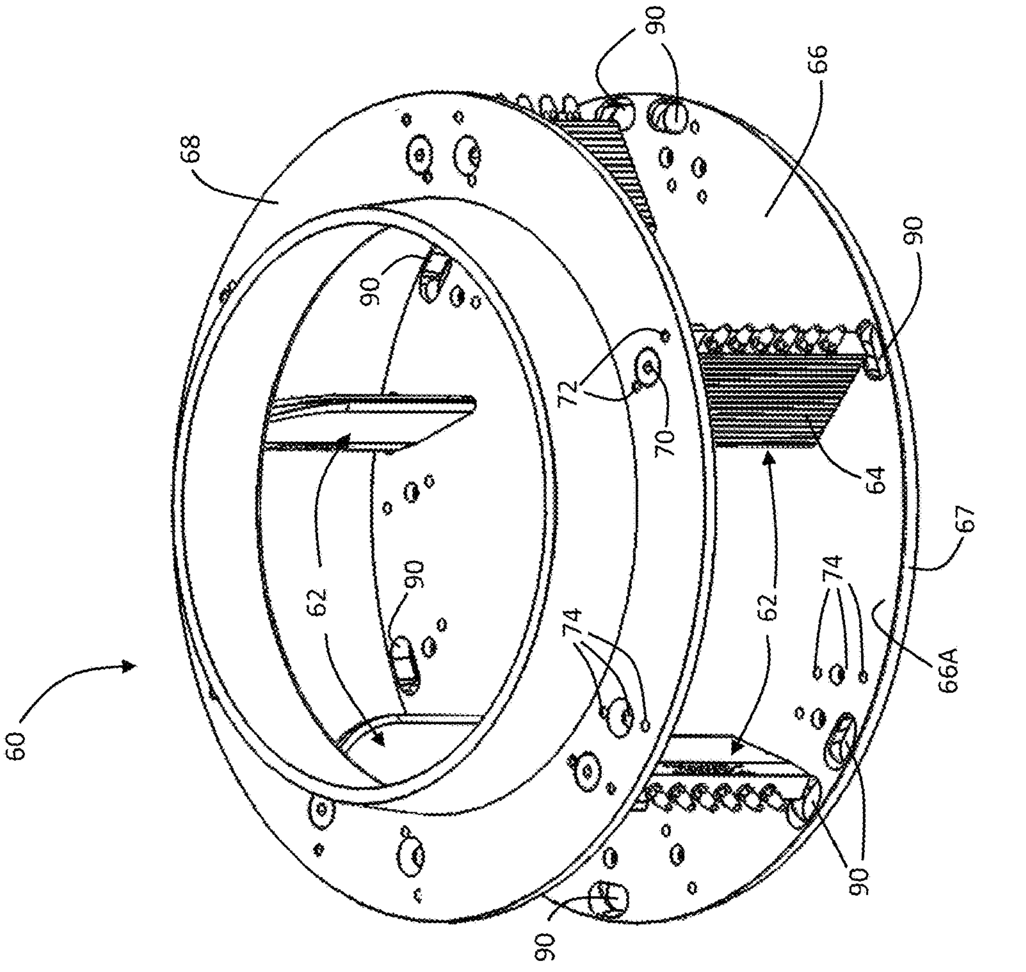
FIG. 5 is a perspective view representing a first embodiment of an impeller capable of use in a centrifugal-type slicing machine of the type represented in FIG. 1 and the cutting head of FIG. 2.
Figure 7:
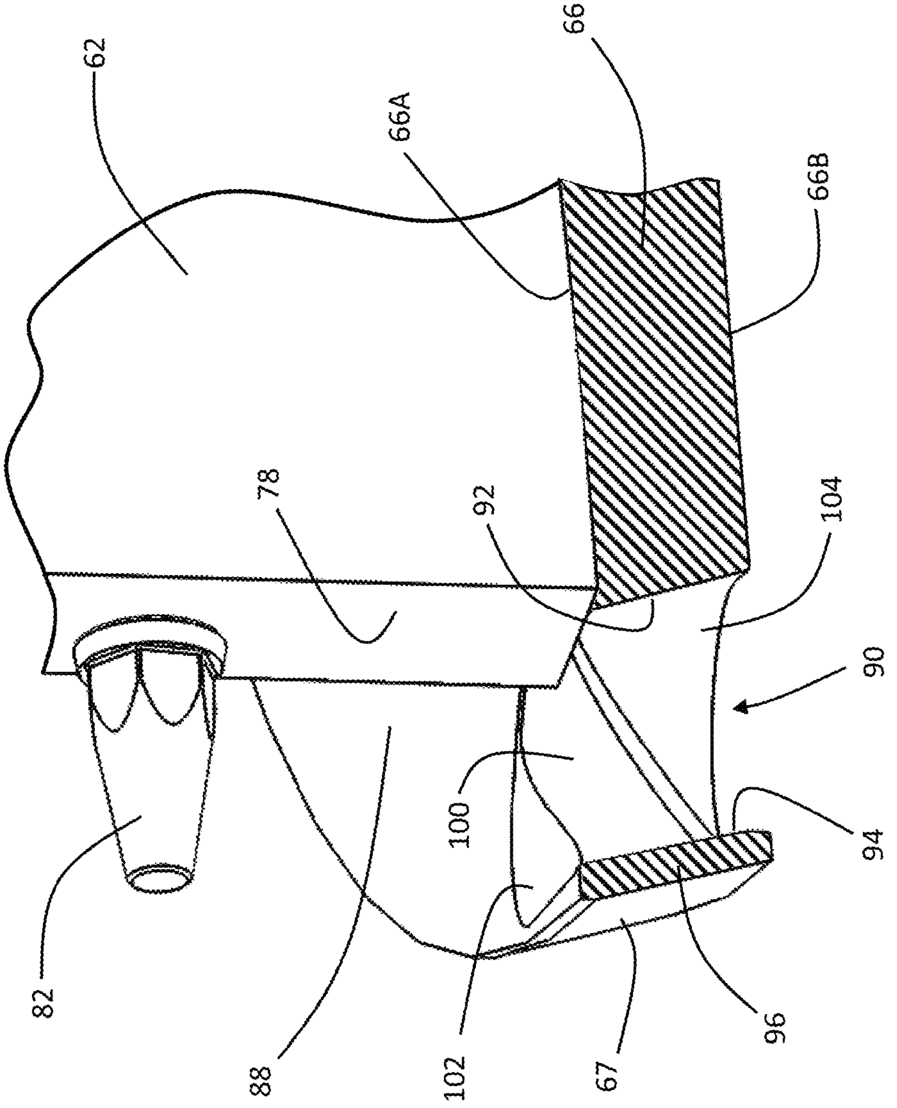
FIG. 7 is a cross-sectional view of an exit hole of the impeller of FIGS. 5 and 6.

FIGS. 5, 6, and 7 schematically represent an impeller 60 in accordance with a first nonlimiting embodiment of the present invention. Similar to the impeller 14 of FIGS. 1, 3, and 4, the impeller 60 has generally radially-oriented paddles 62 with faces 64 that engage and direct product radially outward against knives 20 of the cutting head 12 as the impeller 60 rotates about its axis of rotation. More particularly, centrifugal forces created by the rotation of the impeller 60 cause a product that has entered the impeller 60 to move radially outward, and once the product encounters a paddle 62 its radially outward movement is directed by the paddle 62 toward a knife 20 of the cutting head 12. The paddles 62 shown in the nonlimiting embodiment of FIGS. 5, 6, and 7 are disposed between the lower plate 66 and an annular-shaped upper plate 68. The impeller 60 may be constructed of individually formed paddles 62 mounted and secured between the lower and upper plates 66 and 68, or alternatively the paddles 62 may be cast as integral components of the lower and/or upper plates 66 and 68. If the former, the impeller 60 and its components can be formed by processes other than casting, and formed of various materials in addition to commonly-used MAB alloys.

In the nonlimiting embodiment shown in FIGS. 5, 6, and 7, the paddles 62 may be individually mounted with bolts 70 and pins 72 to a corresponding set of mounting holes 74 machined in the plates 66 and 68, though it is also within the scope of the invention that any of the paddles 62 could be directly attached to only one of the lower and upper plates 66 and 68 and indirectly attached to the other plate 66 or 68 as a result of the lower and upper plates 66 and 68 being coupled together by any suitable means, for example, posts or connecting rods. As shown in FIG. 5, additional sets of mounting holes 74 can be provided in the plates 66 and/or 68 to enable different numbers of paddles 62 to be mounted on the impeller 60. The placement of the mounting holes 74 determines the orientation or pitch of each paddle face 64 relative to a radial of the impeller 60 terminating at the outermost radial extent of the paddle face 64. The placement of the mounting holes 74 can be chosen so that the pitches of the paddle faces 64 are negative (the face 64 of each paddle 62 does not lie on a radial of the impeller 60 and the radially innermost extent of each paddle face 64 is angled away from the direction of rotation of the impeller 60 relative to a radial of the impeller 60), neutral (the face 64 of each paddle 62 lies on a radial of the impeller 60), or positive (the face 64 of each paddle 62 does not lie on a radial of the impeller 60 and the radially innermost extent of each paddle face 64 is angled toward the direction of rotation of the impeller 60 relative to a radial of the impeller 60).

FIG. 6 represents an individual paddle 62 and shows an outer radial extent 78 of the paddle 62 in proximity to the perimeter 67 of the lower plate 66. In the nonlimiting embodiment of FIGS. 5, 6, and 7, the outer radial extents 78 of the paddles 62 are adjacent but not contiguous with the perimeter 67 of the lower plate 66, such that a radial gap or distance exists between the outer radial extent 78 and perimeter 67. The outer radial extent 78 of each paddle 62 is generally straight and oriented in the axial direction of the impeller 60 (from top to bottom in FIG. 6). Suitable dimensions for the paddle 62 will depend in part on the size of the food products being processed, and therefore can vary considerably. As shown, the radially innermost extent of each paddle 62 may curve radially outward as it approaches the upper plate 68, though other shapes and profiles are possible, including straight. FIGS. 5 and 6 further depict the face 64 of each paddle 62 as having the optional feature of axially oriented grooves 80, which can be employed to inhibit round and in some cases spherical products from rotating while engaged by the paddles 62.

The nonlimiting embodiment of FIGS. 5, 6, and 7 depicts the paddles 62 as equipped with multiple posts 82 extending from and spaced along their outer radial extents 78, forming multiple gaps 84 through which foreign debris (which as used herein includes rocks and any other types of contaminants that may accompany and/or be imbedded in a material or product being cut) can pass without damaging the paddles 62 or the knives 20 and knife holders 30 of the cutting head 12. The posts 82 may be replaceable, for example, as a result of being threaded into the outer radial extent 78 of each paddle 62. The posts 82 have generally conical shapes and may be angled so that a profile of its conical shape is coplanar with the face 64 of its paddle 62. As evident from FIGS. 5 and 6, the uppermost extent of each paddle 62 is represented as lacking a post 82 and instead has an upper shear edge 86 (corresponding to the upper shear edge 46 of FIG. 4) that protrudes from the outer radial extent 78 of each paddle 62, whereas the lowermost extent of each paddle 62 is entirely defined by its outer radial extent 78 and lacks the lower shear edge 48 of FIG. 4 as well as a post 82, creating a larger gap 88 along the portion of the outer radial extent 78 below the lowest post 82 of the paddle 62. In the particular but nonlimiting configuration represented in FIGS. 5 and 6, the upper shear edge 86 and the distal ends of the posts 82 define the outermost radial extent of the paddle 62, and the larger gap 88 defines a lower opening through which relatively large rocks and other foreign debris are able to pass in order to escape around the paddle 62 and its the outer radial extent 78. As FIGS. 5, 6, and 7 represent a nonlimiting embodiment, it should be understood that other configurations are possible, including the number and locations of the posts 82, the inclusion of a lower shear edge (e.g., corresponding to the lower shear edge 48 of FIG. 4), and the absence of any or all posts and/or shear edges.

FIGS. 5, 6, and 7 further show multiple exit holes 90 formed in the lower plate 66, located and spaced along the perimeter 67 of the lower plate 66 in proximity to the outer radial extent 78 of each paddle 62 to create passageways through which rocks and other foreign debris can pass to exit the impeller 60 without subsequently encountering the cutting head 12. As such, the exit holes 90 provide the capability of avoiding or at least reducing the risk of damage to the paddles 62 of the impeller 60 and to the knives 20 and knife holders 30 of the cutting head 12. In FIG. 5, the exit holes 90 have been selectively located to accommodate the various alternative locations of the paddles 62 enabled by their mounting holes 74. In the absence of such alternative locations, it is foreseeable that each exit hole 90 may be associated with a single paddle 62.

Due to their different functions, the exit holes 90 differ from the mounting holes 74 in terms of their size, shape, and/or locations on the lower plate 66 of the impeller 60. As shown in FIG. 5, the exit holes 90 are located adjacent the perimeter 67 of the lower plate 66, may be located in proximity to or contiguous with the outer radial extent 78 and/or face 64 of a paddle 62, and may have a shape with its major dimension oriented circumferentially along the perimeter 67 of the lower plate 66. As seen in the nonlimiting embodiment of FIGS. 5, 6, and 7, some or all of the exit holes 90 may be formed to be immediately adjacent and optionally contiguous with the outer radial extent 78 of one or more of the paddles 62, and optionally so that at least a portion of each such exit hole 90 is directly radially outward of the outer radial extent 78 of one or more a paddles 62, and therefore between the outer radial extent 78 and the perimeter 67 of the impeller 60. Additionally, the outer radial extent 78 of one or more paddles 62 may radially project over a radially inward portion of an exit hole 90, though it's foreseeable that the outer radial extent 78 of the paddles 62 do not radially project over the exit holes 90. If the larger gaps 88 are present at the lower ends of the paddles 62, each larger gap 88 may be adjacent and in some cases adjoins one of the exit holes 90 so that each larger gap 88 defines a part of each passageway through which rocks and other foreign debris pass to exit the impeller 60, and also creates an alternative passageway through which debris may continue to the next trailing paddle 62 and exit the impeller 60 through the exit hole 90 associated with that paddle 62.

As shown in FIGS. 5 through 7, the exit holes 90 do not intersect the perimeter 67 at the upper surface 66A of the lower plate 66, and instead are spaced radially inward from the perimeter 67 at the upper surface 66A to define wall sections 96 that completely close each of the exit holes 90 along the perimeter 67 at the upper surface 66A of the lower plate 66. As more readily seen in FIGS. 6 and 7, the exit holes 90 vertically pass entirely through the lower plate 66 between upper and lower surfaces 66A and 66B of the plate 66 such that the wall sections 96 completely close the exit holes 90 along the entire perimeter 67 of the lower plate 66. Though the radially innermost wall 92 and/or the outmost wall 94 of the exit holes 90 may be perpendicular to the upper surface 66A of the plate 66, FIGS. 6 and 7 illustrate the radially innermost and outmost walls 92 and 94 of the exit holes 90 as not perpendicular to the upper surface 66A of the plate 66. Furthermore, the radially outermost wall 94 of each exit hole 90 is illustrated as inclined so that the radially outermost extent of each exit hole 90 at the upper plate surface 66A is radially outboard of the radially outmost extent of the exit hole 90 at the lower plate surface 66B, with the result that the exit holes 90 slope radially inward from the upper surface 66A to the lower surface 66B. Though the surface that defines the perimeter 67 of the lower plate 66 may be perpendicular to the upper surface 66A of the plate 66, in the particular embodiment shown in FIGS. 5 through 7, the surface of the perimeter 67 is tapered and the inclination angle (α) of the radially outermost wall 94 of each exit hole 90 slopes in a manner roughly complementary to the surface of the perimeter 67 so that the wall section 96 may have a uniform thickness between the upper and lower surfaces 66A and 66B of the lower plate 66. Though beneficial for structural strength, a uniform wall thickness is not necessarily required. As such, it is foreseeable that the exit holes 90 could slope radially outward from the upper surface 66A to the lower surface 66B.

Various shapes are foreseeable for the exit holes 90, though in practice it was determined that an oblong shape with the major dimension oriented circumferentially along the perimeter 67 of the lower plate 66, in combination with the closed perimeter of the lower plate 66, was able to prevent rocks and other foreign debris from making contact with a knife 20 or other head components while exiting through the exit holes 90. Various sizes and shapes are foreseeable for the exit holes 90, depending on the shape and/or size of the product being cut and the shape and size of the debris that might be encountered. A consideration when slicing starch-containing products, including but not limited to root vegetables such as potatoes, is that starch released during the slicing process is capable of plugging an exit hole 90. For this reason, a minimum cross-sectional dimension (in a plane parallel to the upper and lower surfaces 66A and 66B of the lower plate 66, including the radial and/or circumferential directions) for the exit holes 90 when slicing potatoes is believed to be about 3/16 inch (about 4.5 mm). If slicing potatoes of sizes commonly used to produce chips and crisps, a maximum radial dimension (the width of an exit hole 90 in a radial direction of the impeller 60) for the exit holes 90 is believed to be about 1.2 inch (about 30 mm) in order to achieve acceptable slicing performance. More generally, particularly suitable radial and circumferential dimensions are believed to be greater than 5/16 inch to about 1.2 inches (greater than about 8 mm to about 30 mm) and greater than 5/16 inch to about 2 inches (about 8 mm to about 50 mm), respectively, more preferably about 0.375 to about 0.5 inch (about 9.5 mm to about 12.5 mm) and about 0.75 to about 1.25 inch (about 19 mm to about 32 mm), respectively. In practice, exit holes 90 having radial and circumferential dimensions, respectively, of about 0.50 by 1 inch (about 12.5 by 25 mm) have been shown to be suitable.

Figure 8:
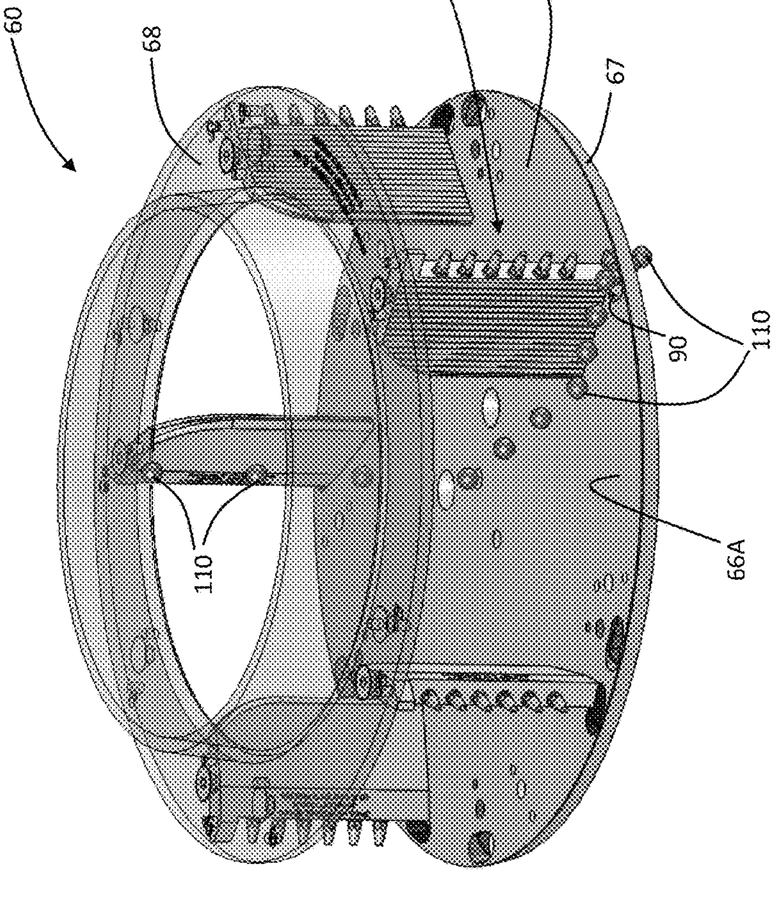
FIG. 8 is a perspective view representing the trajectory of a rock within the impeller of FIG. 5.

FIG. 8 represents an exemplary trajectory of a rock (or other foreign debris) 110 that vertically enters the impeller 60 of FIGS. 5 through 7 along its axis of rotation, travels horizontally across the upper surface 66A of the lower plate 66 under the influence of centrifugal forces generated by the rotation of the impeller 60, and then downward through one of the exit holes 90 in the lower plate 66. The last two or three representations of the rock 110 in FIG. 8 indicate a likely route of a rock in the event that the rock was embedded in a product and dislodged during cutting.

Figure 9A:
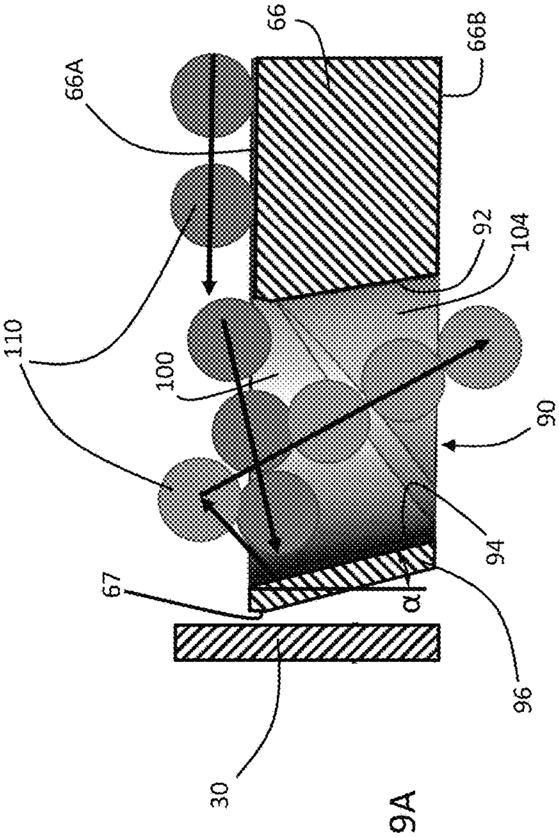
FIG. 9A is a detailed side view representing a trajectory of a rock through an exit hole of the impeller of FIG. 5.

FIG. 9A represents an exemplary trajectory of a rock 110 as it encounters and then travels through one of the exit holes 90. From FIG. 9A, it can be appreciated that the trajectory of the rock 110 across the upper surface 66A of the lower plate 66 results in the rock 110 impacting the radially outermost wall 94 of the exit hole 90 before being deflected downward through the exit hole 90. As such, the edge condition of the exit hole 90 defined by the radially outermost wall 94, in particular, its angle relative to the upper surface 66A of the lower plate 66, may be tailored to promote the rock 110 dropping down through the exit hole 90 after impacting the outermost wall 94, instead of bouncing out of the exit hole 90 and potentially colliding with the knife 20 or the immediately adjacent lower end of the knife holder 30 visible in FIG. 9A. Though optimal angles foreseeably depend on the size and shape of the exit hole 90, the elasticity, size, and mass of the foreign debris, and rotational speed of the impeller 60, in practice it was determined that, if the exit holes 90 slope radially inward as shown, an angle (α) of not greater than about 25 degrees from vertical (generally about 65 degrees or more to the upper surface 66A of the lower plate 66) was better able to force foreign debris to exit downward through the exit holes 90.

Figure 9B:
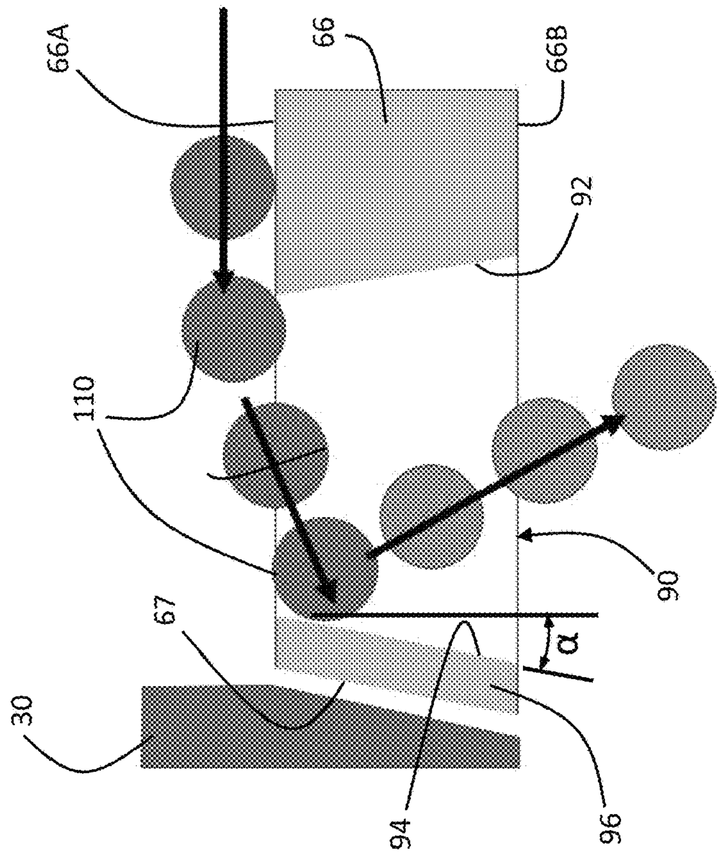
FIG. 9B is a detailed side view representing a trajectory of a rock through a differently configured exit hole of an alternative impeller.

FIG. 9B schematically represents an alternative configuration for an exit hole 90 evidencing potential benefits of a tapered exit hole 90 whose radial dimension increases between the surfaces 66A and 66B of the lower plate 66. The angle (α) of the outermost wall 94 relative to the upper surface 66A of the lower plate 66 may again be tailored to promote the rock 110 dropping down through the exit hole 90 after impacting the outermost wall 94. The exit hole 90 is represented as sloping radially outward at an angle (α) of about 10 degrees from vertical, though optimal angles will again depend on the size and shape of the exit hole 90, the elasticity, size, and mass of the foreign debris, and rotational speed of the impeller 60. FIG. 9B also represents the surface that defines the perimeter 67 of the lower plate 66 and the radially inward surface of the lower end of the knife holder 30 as having complementary tapers to the outermost wall 94 of the exit hole 90.

Figure 10:
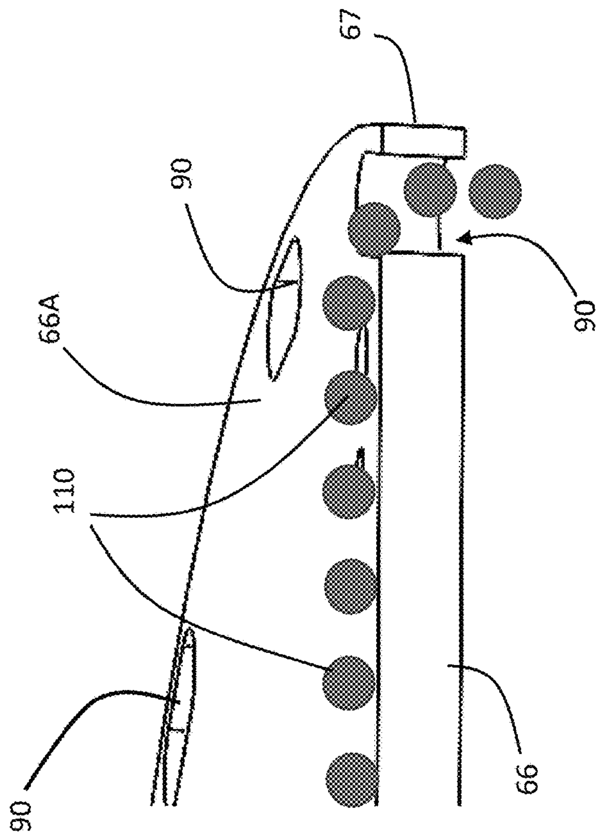
FIG. 10 is a detailed side view representing an alternative trajectory of a rock through an exit hole of the impeller of FIG. 5.

From FIGS. 9A and 9B, it can be further appreciated that the radial dimension (the width of an exit hole 90 in a radial direction of the impeller 60) of the exit hole 90 must be sufficiently great to ensure that rocks and foreign debris will drop down through the exit hole 90, either after impacting the outermost wall 94 or by simply dropping through the exit hole 90 from the surface 66A of the lower plate 66. FIG. 10 is representative of the latter scenario.

Figure 11:
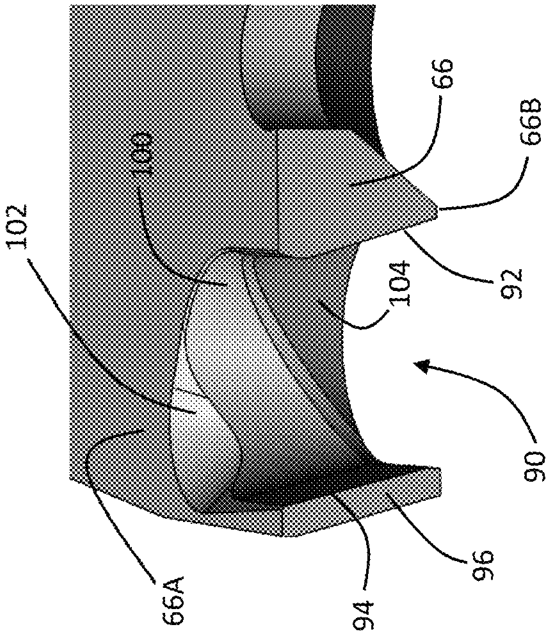
FIG. 11 schematically represents an exemplary exit hole of the type shown in FIGS. 5 through 10.

In the particular embodiment shown in FIGS. 7 and 9A, it can be seen that the walls of the represented exit hole 90 may be defined by multiple wall surface regions having different orientations relative to each other. It is believed that such a configuration may promote exiting of rocks and foreign debris through the exit holes 90, and in doing so, reduce the risk of damage to the knife 20, knife holder 30, paddle 62, etc., as well as reduce the risk of debris becoming wedged between the knife holders 30 and the outer radial extents 78 of the paddles 62. An exemplary exit hole 90 geometry is shown in FIG. 11, which depicts an inclined wall 100 that includes the outermost wall 94 of the exit hole 90. A lead-in wall surface 102 is shown oriented at an angle of about 45° to the upper surface 66A of the lower plate 66. An exit wall surface 104 serves to increase the size of the lower exit of the exit hole 90 without altering the outermost wall 94 of the exit hole 90. As a result of the geometry shown in FIG. 11, the lower exit of the exit hole 90 at the lower surface 66B of the lower plate 66 is larger than the upper entrance of the exit hole 90 at the upper surface 66A of the lower plate 66 to promote egress of rocks and foreign debris from the impeller 60 through the exit hole 90. Though the geometry of the exit hole 90 represented in FIG. 11 has been shown to be particularly effective at expelling rocks 110 from the impeller 60, other machining methods and exit hole configurations are foreseeable, including but not limited to the exit hole configurations described above.

FIGS. 12A through 14B represent nonlimiting embodiments in which the radially innermost and outmost walls 92 and 94 of exit holes 90 are perpendicular to the upper surface 66A of the lower plate 66 of the impeller 60. In FIGS. 12A through 14B, the surface that defines the perimeter 67 of the lower plate 66 is also perpendicular to the upper surface 66A of the plate 66, with the result that the orientations of the exit holes 90 are complementary to the surface of the perimeter 67 and the wall section 96 has a uniform thickness between the upper and lower surfaces 66A and 66B of the lower plate 66. The walls 92 and 94 need not be parallel to each other or to the surface of the perimeter 67, and instead either wall 92 and 94 and/or the perimeter 67 could be inclined or perpendicular to the surface 66A of the lower plate 66.

Figure 12A:
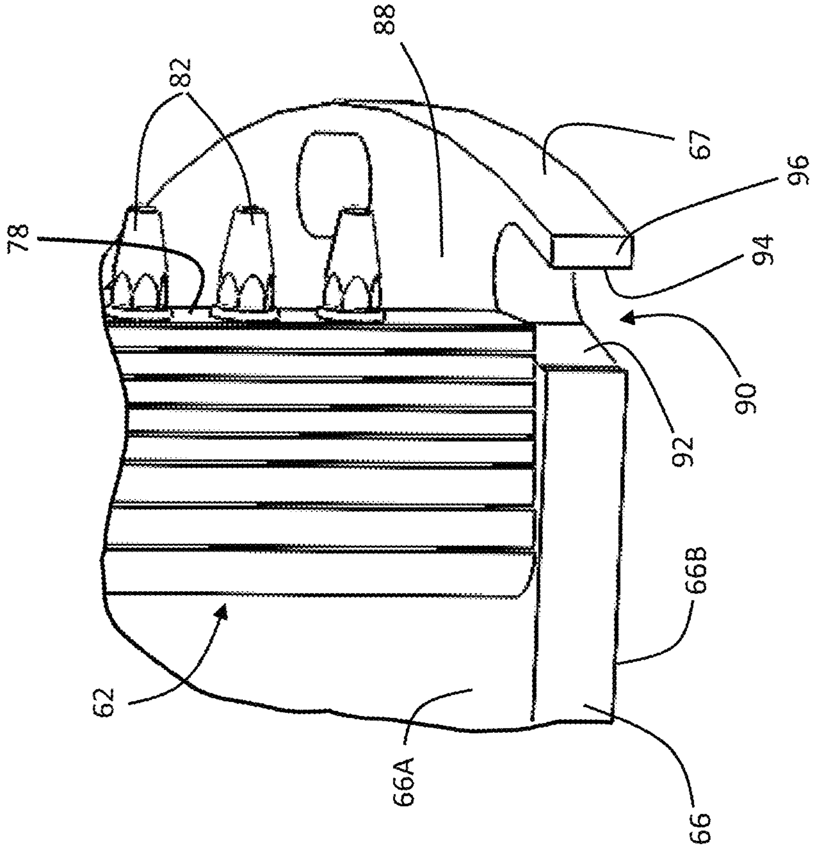
FIGS. 12A through 12C are detailed side views showing nonlimiting embodiments of an alternative configuration of the exit hole and alternative paddles capable of use with the impeller of FIG. 5.
Figure 12C:
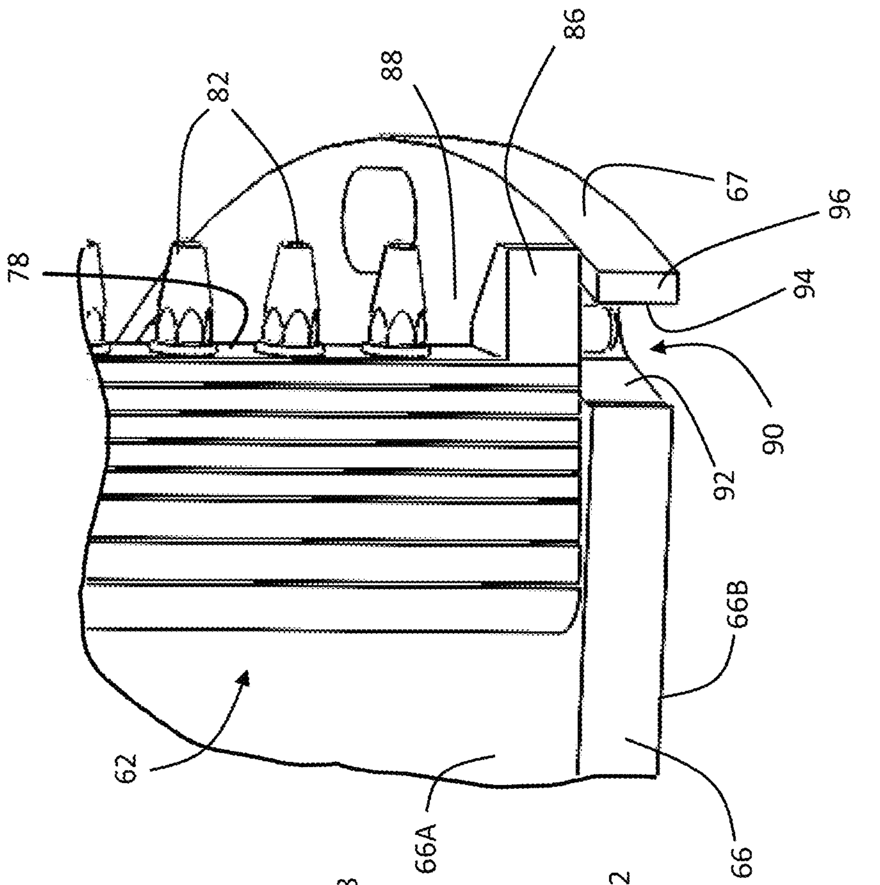
Figure 12B:
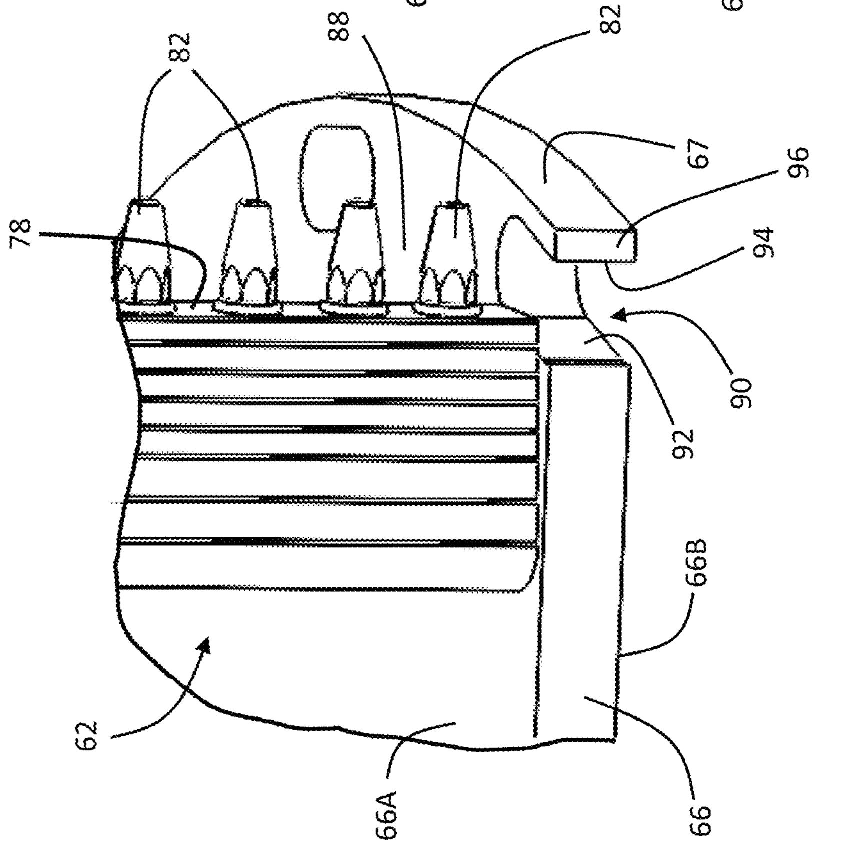

FIGS. 12A through 12C also represent paddles 62 whose radially outermost extremities have different configurations. The paddles 62 of FIGS. 12A through 12C also share similarly sized paddles 62, whose radially lengths are less than that of the paddles 62 shown in FIGS. 5 through 8. The paddle 62 represented in FIG. 12A is similar to the paddles 62 represented in FIGS. 5 through 8 in that the lowermost extent of the paddle 62 lacks the lower shear edge 48 of FIG. 4 as well as a post 82, creating the aforementioned larger gap 88 immediately above the surface 66A of the plate 66 and along the axial face of the outer radial extent 78 through which relative large rocks and other foreign debris are able to pass in order to escape around the outer radial extent 78 of the paddle 62. The paddle 62 represented in FIG. 12B differs from the paddles 62 represented in FIGS. 5 through 8 and 12A in that an additional post 82 has been mounted to the axial face of the outer radial extent 78 at the lowermost extent of the paddle 62, with the result that the length of the larger gap 88 along the axial face of the outer radial extent 78 immediately above the plate surface 66A is less than that of the paddles 62 represented in FIGS. 5 through 8 and 12A. Finally, the paddle 62 represented in FIG. 12C differs from the paddles 62 represented in FIGS. 5 through 8, 12A, and 13 in that a shear edge 86 (similar to the shear edge 48 of FIG. 4) projects below the outer radial extent 78 at the lowermost extent of the paddle 62 with the result that, in addition to the length of the larger gap 88 being less than that of the paddles 62 represented in FIGS. 5 through 8 and 12A, the larger gap 88 is above but spaced apart from the plate surface 66A by the height of the shear edge 86.

Figure 13A:
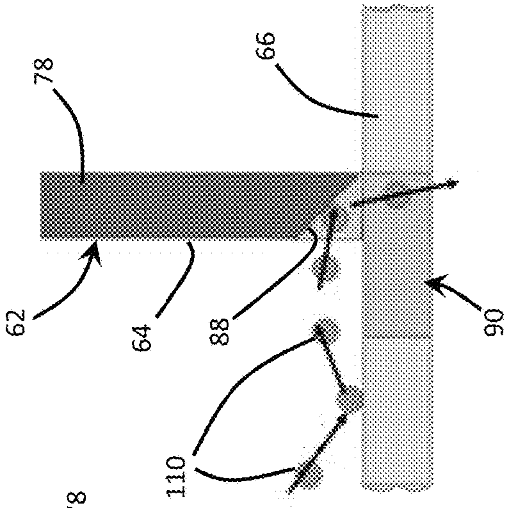
FIGS. 13A and 13B schematically represent alternative configurations of paddles capable of use with the impeller of FIG. 5.
Figure 13A:
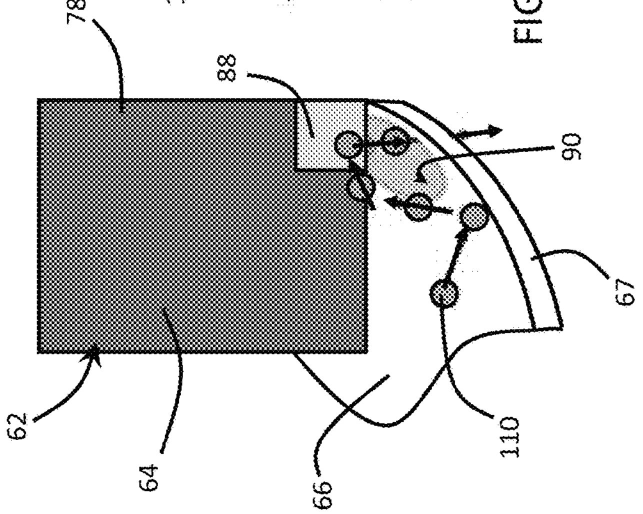

FIG. 13A schematically represents a paddle 62 that lacks grooves 80 and posts 82 and whose outer radial extent 78 projects entirely over an exit hole 90. Additionally, the paddle 62 incorporates a larger gap 88 formed by a tapered relief machined or otherwise defined in the face 64 of the paddle 62 that engages products during slicing. As shown, the larger gap 88 is positioned immediately adjacent the outer radial extent 78 of the paddle 62 and relative to the exit hole 90 to direct rocks 110 downward through the exit hole 90.

Figure 13B:
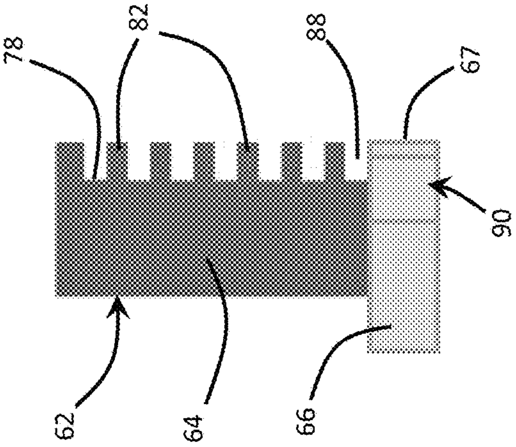

FIG. 13B schematically represents a paddle 62 that lacks grooves 80 in its face 64 and whose outer radial extent 78 does not project over any portion of the exit hole 90. Additionally, the paddle 62 has been machined to define posts 82 that protrude from the outer radial extent 78 of the paddle 62, instead of posts 82 previously shown as being separately fabricated and mounted to the outer radial extent 78 of a paddle 62. As shown, the lowermost post 82 defines a gap 88 relative to the exit hole 90 through which relative large rocks and other foreign debris are able to pass in order to escape around the outer radial extent 78 of the paddle 62.

Figure 14B:
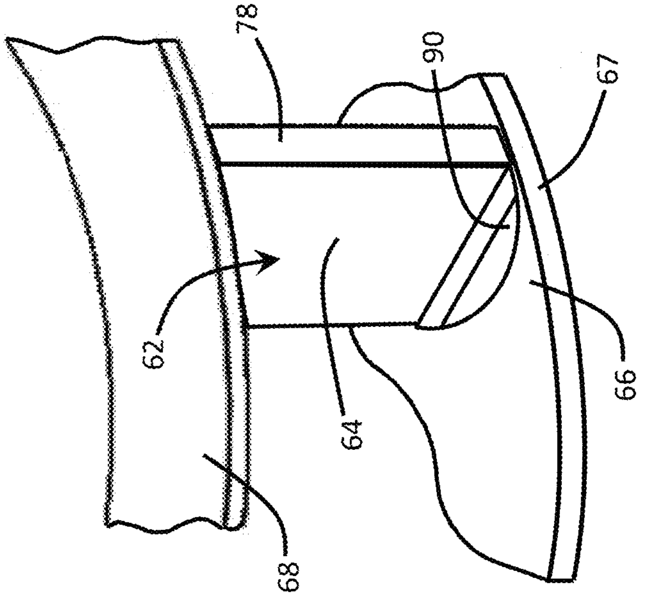
FIGS. 14A and 14B schematically represent alternative locations and configurations for exit holes capable of use with the impeller of FIG. 5.
Figure 14A:
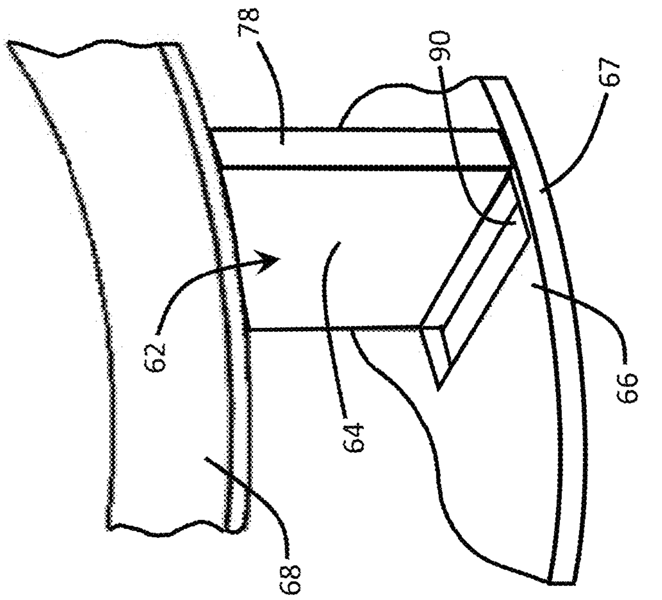

FIGS. 14A and 14B schematically represent alternative locations and configurations for exit holes 90. The exit holes 90 are represented as adjacent to and extending along the faces 64 of the paddles 62 that engage products during slicing. In FIG. 14A, the exit hole 90 has a rectangular shape, whereas the exit hole 90 shown in FIG. 14B has a semicircular shape. Other shapes are foreseeable, including square and circular shapes that meet the cross-sectional dimensions described above for the exit holes 90.

Figure 16:
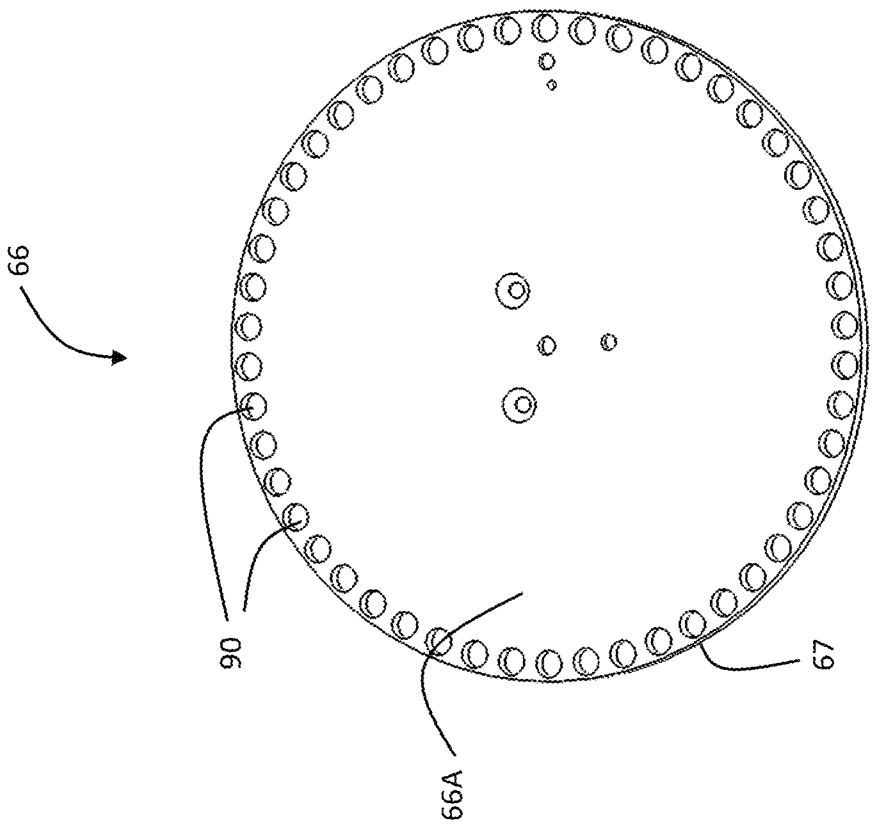
FIGS. 15 and 16 are plan views of lower plates of second and third embodiments of impellers that are capable of use in a centrifugal-type slicing machine of the type represented in FIG. 1.
Figure 15:
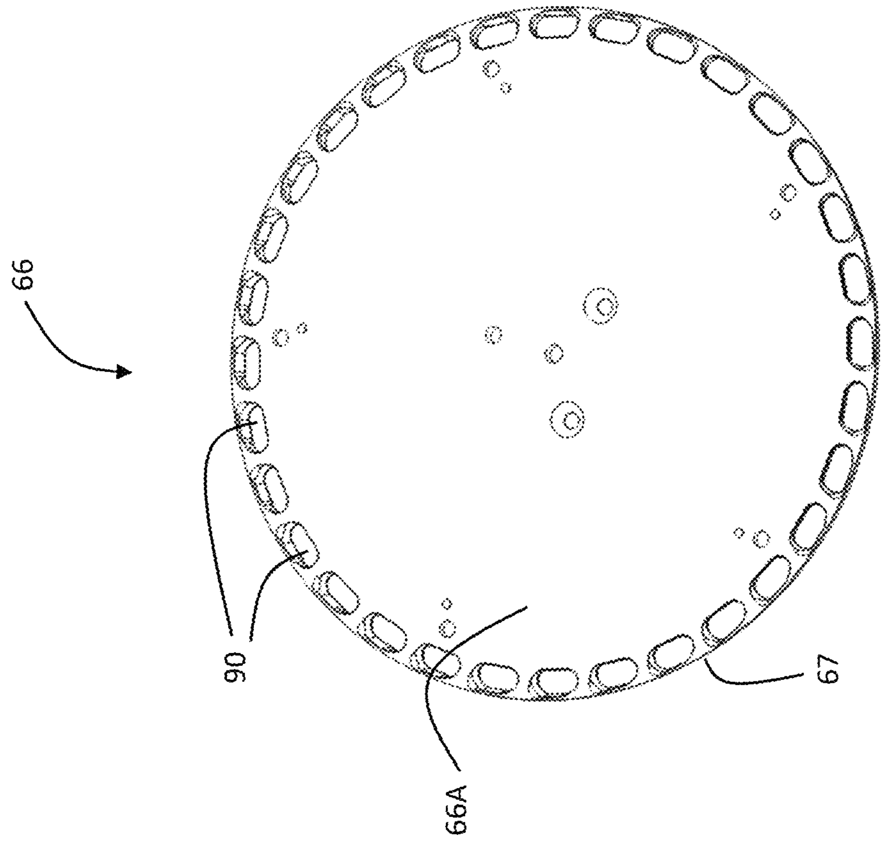

FIGS. 15 and 16 schematically represent lower plates 66 of other nonlimiting embodiments of impellers 60 fabricated to have exit holes 90 (oblong and circular, respectively) that are circumferentially spaced along their entire perimeters 67. In some instances, the exit holes 90 may be equally circumferentially spaced along the entire perimeter 67. In either instance, the exit holes 90 can have cross-sectional dimensions similar to the exit holes 90 described above. Other aspects of the embodiments of FIGS. 15 and 16 can be, in terms of structure, function, materials, etc., essentially as was described for the embodiments of FIGS. 5 through 14B.

While the invention has been described in terms of specific or particular embodiments, it should be apparent that alternatives could be adopted by one skilled in the art. For example, the machine 10, cutting head 12, impeller 60, and their respective components could differ in appearance and construction from the embodiments described herein and shown in the drawings, functions of certain components of the machine 10, cutting head 12, and/or impeller 60 could be performed by components of different construction but capable of a similar (though not necessarily equivalent) function, and various materials could be used in their fabrication. In addition, the invention encompasses additional or alternative embodiments in which one or more features or aspects of a particular embodiment could be eliminated or two or more features or aspects of different disclosed embodiments could be combined. Accordingly, it should be understood that the invention is not necessarily limited to any embodiment described herein or illustrated in the drawings. It should also be understood that the purpose of the above detailed description and the phraseology and terminology employed therein is to describe the illustrated embodiments, and not necessarily to serve as limitations to the scope of the invention. Therefore, the scope of the invention is to be limited only by the following claims.

The invention claimed is:

1. An impeller adapted to be coaxially mounted within a cutting head for rotation about an axis of the cutting head, the impeller comprising:

a lower plate having an upper surface, a lower surface, and a perimeter;

paddles configured with the lower plate to direct material placed on the lower plate in a radially outward direction of the impeller when the impeller is rotated, at least one of the paddles having a face that contacts the material when the impeller is rotated and an outer radial extent that is adjacent the perimeter of the lower plate; and at least a first exit hole located in the lower plate adjacent the perimeter of the lower plate and touching the face of the at least one of the paddles, the first exit hole having a wall section that completely closes the first exit hole along the perimeter at the upper surface of the lower plate, the first exit hole extending through the lower plate to define a passageway connected to the upper surface, wherein a foreign debris that is under influence of centrifugal forces generated by the rotation of the impeller and has a trajectory along the face of the at least one of the paddles and contacts the face encounters the first exit hole.

2. The impeller according to claim 1, wherein the first exit hole has a major dimension oriented along the perimeter of the lower plate.

3. The impeller according to claim 1, wherein the first exit hole has a circular cross-section.

4. The impeller according to claim 1, wherein the at least one of the paddles comprises posts extending in the radially outward direction of the impeller from the outer radial extent of the at least one of the paddles.

5. The impeller according to claim 4, wherein the posts are spaced apart along the outer radial extent of the at least one of the paddles to define gaps therebetween, and a lowermost extent of the at least one of the paddles lacks a lower shear edge and lacks a post to create a second gap through which debris are able to pass and escape around the outer radial extent of the at least one of the paddles.

6. The impeller according to claim 5, wherein the second gap of the at least one of the paddles is adjacent the first exit hole associated with the at least one of the paddles so that the second gap defines a part of the passageway through which foreign debris pass to exit the impeller.

7. The impeller according to claim 1, wherein the outer radial extent of the at least one of the paddles touches first exit hole.

8. The impeller according to claim 1, wherein the first exit hole is located adjacent to and extends along the face of the at least one of the paddles.

9. The impeller according to claim 1, wherein the first exit hole has a wall that is not perpendicular to the upper surface of the lower plate.

10. The impeller according to claim 1, wherein the first exit hole has a radially outermost wall that is not perpendicular to the upper surface of the plate.

11. An impeller adapted to be coaxially mounted within a cutting head for rotation about an axis of the cutting head, the impeller comprising:

a lower plate having an upper surface, a lower surface, and a perimeter;

paddles configured with the lower plate to direct material placed on the lower plate in a radially outward direction of the impeller when the impeller is rotated, at least one of the paddles having an outer radial extent that is adjacent the perimeter of the lower plate; and at least a first exit hole located in the lower plate, the first exit hole having a wall section that completely closes the first exit hole along the perimeter at the upper surface of the lower plate, the first exit hole extending through the lower plate to define a passageway connected to the upper surface to enable foreign debris at the upper surface to exit the impeller through the passageway;

wherein the first exit hole has a radially outermost wall that is not perpendicular to the upper surface of the plate; and wherein the radially outermost wall of the first exit hole is inclined to slope radially inward from the upper surface to the lower surface of the lower plate at an angle of not greater than 25 degrees to vertical.

12. An impeller adapted to be coaxially mounted within a cutting head for rotation about an axis of the cutting head, the impeller comprising:

a lower plate having an upper surface, a lower surface, and a perimeter;

paddles configured with the lower plate to direct material placed on the lower plate in a radially outward direction of the impeller when the impeller is rotated, at least one of the paddles having an outer radial extent that is adjacent the perimeter of the lower plate; and at least a first exit hole located in the lower plate, the first exit hole having a wall section that completely closes the first exit hole along the perimeter at the upper surface of the lower plate, the first exit hole extending through the lower plate to define a passageway connected to the upper surface to enable foreign debris at the upper surface to exit the impeller through the passageway;

wherein the first exit hole has a radially outermost wall that is not perpendicular to the upper surface of the plate; and wherein the radially outermost wall of the first exit hole is inclined to slope radially outward from the upper surface to the lower surface of the lower plate.

13. The impeller according to claim 1, wherein the first exit hole has a minimum cross-sectional dimension of greater than 8 mm.

14. The impeller according to claim 1, wherein the first exit hole has a maximum radial dimension of about 30 mm.

15. The impeller according to claim 1, wherein the first exit hole has radial and circumferential dimensions of greater than 8 mm to about 30 mm and greater than 8 mm to about 50 mm, respectively.

16. The impeller according to claim 1, wherein the first exit hole has radial and circumferential dimensions of about 9.5 mm to 12.5 mm and about 19 mm to about 32 mm, respectively.

17. The impeller according to claim 1, wherein the outer radial extent of the at least one of the paddles is spaced apart from the perimeter of the lower plate such that a radial gap exists between the outer radial extent and the perimeter.

18. The impeller according to claim 17, wherein the first exit hole has at least a portion thereof within the radial gap between the perimeter of the lower plate and the outer radial extent of the at least one of the paddles.

19. The impeller according to claim 1, wherein the outer radial extent of the at least one of the paddles is adjacent the perimeter of the lower plate and the first exit hole is adjacent the outer radial extent and the perimeter.

20. A cutting machine comprising an annular-shaped cutting head and an impeller coaxially mounted within the cutting head for rotation about an axis of the cutting head in a rotational direction relative to the cutting head, the cutting head having multiple knives each extending radially inward toward the impeller in a direction opposite the rotational direction of the impeller, the impeller comprising:

a lower plate having an upper surface, a lower surface, and a perimeter;

paddles configured with the lower plate to direct material placed on the lower plate in a radially outward direction of the impeller when the impeller is rotated, at least one of the paddles having a face that contacts the material when the impeller is rotated and an outer radial extent that is adjacent the perimeter of the lower plate; and at least a first exit hole located in the lower plate adjacent the perimeter of the lower plate and touching the of the at least one of the paddles, the first exit hole having a wall section that completely closes the first exit hole along the perimeter at the upper surface of the lower plate, the first exit hole extending through the lower plate to define a passageway connected to the upper surface, wherein a foreign debris that is under influence of centrifugal forces generated by the rotation of the impeller and has a trajectory along the face of the at least one of the paddles and contacts the face encounters the first exit hole.

21. The cutting machine according to claim 20, wherein the first exit hole has a major dimension oriented along the perimeter of the lower plate.

22. The cutting machine according to claim 20, wherein the first exit hole has a circular cross-section.

23. The cutting machine according to claim 20, further comprising posts extending in the radially outward direction of the impeller from the outer radial extent of the at least one of the paddles.

24. The cutting machine according to claim 23, wherein the posts are spaced apart along the outer radial extents of the at least one of the paddles to define gaps therebetween, and a lowermost extent of the at least one of the paddles lacks a lower shear edge and lacks a post to create a second gap through which debris are able to pass and escape around the outer radial extent of the at least one of the paddles.

25. The cutting machine according to claim 24, wherein the second gap of the at least one of the paddles is adjacent the first exit hole associated with the at least one of the paddles so that the second gap defines a part of the passageway through which foreign debris pass to exit the impeller.

26. The cutting machine according to claim 20, wherein the outer radial extents of the at least one of the paddles touches with the first exit hole.

27. The cutting machine according to claim 20, wherein the first exit hole is located adjacent to and extends along the face of the at least one of the paddles.

28. The cutting machine according to claim 20, wherein the first exit hole has a wall that is not perpendicular to the upper surface of the lower plate.

29. The cutting machine according to claim 20, wherein the first exit hole has a radially outmost wall that is not perpendicular to the upper surface of the plate.

30. The cutting machine according to claim 29, wherein the radially outermost wall of the first exit hole is inclined to slope radially inward from the upper surface to the lower surface of the lower plate at an angle of not greater than 25 degrees to vertical.

31. The cutting machine according to claim 29, wherein the radially outermost wall of the first exit hole is inclined to slope radially outward from the upper surface to the lower surface of the lower plate.

32. The cutting machine according to claim 20, wherein the first exit hole has a minimum cross-sectional dimension of greater than 8 mm.

33. The cutting machine according to claim 20, wherein the first exit hole has a maximum radial dimension of about 30 mm.

34. The cutting machine according to claim 20, wherein the first exit hole has radial and circumferential dimensions of greater than 8 mm to about 30 mm and greater than 8 mm to about 50 mm, respectively.

35. The cutting machine according to claim 20, wherein the first exit hole has radial and circumferential dimensions of about 9.5 mm to 12.5 mm and about 19 mm to about 32 mm, respectively.

36. The cutting machine according to claim 20, wherein the outer radial extent of the at least one of the paddles is spaced apart from the perimeter of the lower plate such that a radial gap exists between the outer radial extent and the perimeter.

37. The cutting machine according to claim 36, wherein the first exit hole has at least a portion thereof within the radial gap between the perimeter of the lower plate and the outer radial extent of the at least one of the paddles.

38. The cutting machine according to claim 20, wherein the outer radial extent of the at least one of the paddles is adjacent the perimeter of the lower plate and the first exit hole is adjacent the outer radial extent and the perimeter.

39. An impeller adapted to be coaxially mounted within a cutting head for rotation about an axis of the cutting head, the impeller comprising:

a lower plate having an upper surface, a lower surface, and a perimeter;

paddles configured with the lower plate to direct material placed on the lower plate in a radially outward direction of the impeller when the impeller is rotated, at least one of the paddles having an outer radial extent that is adjacent the perimeter of the lower plate; and at least a first exit hole located in the lower plate, the first exit hole having a wall section that completely closes the first exit hole along the perimeter at the upper surface of the lower plate, the first exit hole extending through the lower plate to define a passageway connected to the upper surface to enable foreign debris at the upper surface to exit the impeller through the passageway;

wherein the first exit hole has a radially outermost wall that is not perpendicular to the upper surface of the plate;

wherein the at least one of the paddles comprises posts extending in the radially outward direction of the impeller from the outer radial extent of the at least one of the paddles;

wherein the posts are spaced apart along the outer radial extent of the at least one of the paddles to define first gaps therebetween, and a lowermost extent of the at least one of the paddles lacks a lower shear edge and lacks a post to create a second gap through which debris are able to pass and escape around the outer radial extent of the at least one of the paddles.

40. The impeller according to claim 39, wherein the second gap is larger than at least one of the first gaps.

41. The impeller according to claim 40, wherein a single one of the posts separates the second gap from the at least one of the first gaps.

42. The impeller according to claim 39, wherein the second gap of the at least one of the paddles is adjacent the first exit hole associated with the at least one of the paddles so that the second gap defines a part of the passageway through which foreign debris pass to exit the impeller.

43. A cutting machine comprising an annular-shaped cutting head and an impeller coaxially mounted within the cutting head for rotation about an axis of the cutting head in a rotational direction relative to the cutting head, the cutting head having multiple knives each extending radially inward toward the impeller in a direction opposite the rotational direction of the impeller, the impeller comprising:

a lower plate having an upper surface, a lower surface, and a perimeter;

paddles configured with the lower plate to direct material placed on the lower plate in a radially outward direction of the impeller when the impeller is rotated, at least one of the paddles having an outer radial extent that is adjacent the perimeter of the lower plate; and at least a first exit hole located in the lower plate, the first exit hole having a wall section that completely closes the first exit hole along the perimeter at the upper surface of the lower plate, the first exit hole extending through the lower plate to define a passageway connected to the upper surface to enable foreign debris at the upper surface to exit the impeller through the passageway;

wherein the first exit hole has a radially outermost wall that is not perpendicular to the upper surface of the plate;

wherein the at least one of the paddles comprises posts extending in the radially outward direction of the impeller from the outer radial extent of the at least one of the paddles;

wherein the posts are spaced apart along the outer radial extent of the at least one of the paddles to define first gaps therebetween, and a lowermost extent of the at least one of the paddles lacks a lower shear edge and lacks a post to create a second gap through which debris are able to pass and escape around the outer radial extent of the at least one of the paddles.

44. The cutting machine according to claim 43, wherein the second gap is larger than at least one of the first gaps.

45. The cutting machine according to claim 44, wherein a single one of the posts separates the second gap from the at least one of the first gaps.

46. The cutting machine according to claim 43, wherein the second gap of the at least one of the paddles is adjacent the first exit hole associated with the at least one of the paddles so that the second gap defines a part of the passageway through which foreign debris pass to exit the impeller.

* * * * *